(12) United States Patent
Lutterkort

(10) Patent No.: US 8,341,652 B2
(45) Date of Patent: *Dec. 25, 2012

(54) METHOD FOR PROGRAMMATIC EDITING OF CONFIGURATION FILES

(75) Inventor: David Lutterkort, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 974 days.

This patent is subject to a terminal disclaimer.

(21) Appl. No.: 12/394,006

(22) Filed: Feb. 26, 2009

(65) Prior Publication Data

US 2010/0218199 A1 Aug. 26, 2010

(51) Int. Cl.
*G06F 9/44* (2006.01)
*G06F 5/02* (2006.01)

(52) U.S. Cl. .......................................... 719/328; 706/48
(58) Field of Classification Search .................. 719/328; 715/234

See application file for complete search history.

(56) References Cited

U.S. PATENT DOCUMENTS

| | | | | |
|---|---|---|---|---|
| 5,745,902 A * | 4/1998 | Miller et al. | ......................... | 1/1 |
| 7,412,649 B2 * | 8/2008 | Emek et al. | ................... | 715/235 |
| 2003/0035547 A1 * | 2/2003 | Newton | ........................ | 380/279 |
| 2004/0093342 A1 * | 5/2004 | Arbo et al. | ..................... | 707/102 |
| 2004/0189713 A1 * | 9/2004 | Thames et al. | ................ | 345/810 |
| 2006/0106841 A1 * | 5/2006 | Bybee et al. | .................. | 707/101 |
| 2008/0082962 A1 * | 4/2008 | Falk et al. | ..................... | 717/113 |
| 2010/0218200 A1 | 8/2010 | Lutterkort | | |

OTHER PUBLICATIONS

USPTO; Office Action for U.S. Appl. No. 12/394,008, mailed Mar. 14, 2012.

* cited by examiner

*Primary Examiner* — Andy Ho
*Assistant Examiner* — Abdou Seye
(74) *Attorney, Agent, or Firm* — Lowenstein Sandler PC

(57) ABSTRACT

A file format corresponding to each configuration file is identified. Each configuration file is parsed into a single tree structure with the corresponding file format. The single tree structure is modified with an Application Program Interface (API). The configuration file is bidirectionally updated to reflect the modified single tree structure while preserving the file format of each configuration file. The file format includes instructions on how each entry in each configuration file is to be mapped into the single tree structure.

14 Claims, 7 Drawing Sheets

METHOD FOR PROGRAMMATIC EDITING OF CONFIGURATION FILES

RELATED APPLICATIONS

The present application is related to co-pending application serial No. 12/394,008, entitled "Method for programmatic editing of text files", filed on Feb. 26, 2009.

TECHNICAL FIELD

Embodiments of the present invention relate to computing systems, and more particularly, to changing configuration files in Unix-based machines.

BACKGROUND

Unix-based configuration management lacks a local configuration API. Without such an API, programmatic configuration changes and higher-level configuration services such as configuration daemons and remote configuration API's are based on ad-hoc mechanisms that are fragile and hard to develop and maintain. At the same time, the main culprit for this situation, that configuration data is generally stored in configuration files in a wide variety of formats, is both an important part of the Linux culture and valuable when humans need to make configuration changes manually.

Changing configuration files on Unix-style machines from scripts/programs is extremely hard and error prone because the formats and conventions of those files varies widely from file to file.

BRIEF DESCRIPTION OF THE DRAWINGS

The present invention is illustrated by way of examples and not by way of limitation, in the figures of the accompanying drawings and in which.

DETAILED DESCRIPTION

Described herein is a method and apparatus for editing configuration files with different formats. In one embodiment, a file format corresponding to each configuration file is identified. Each configuration file is parsed into a single tree structure with the corresponding file format. The tree structure is modified with an Application Program Interface (API). Each configuration file is updated to reflect the modified tree structure while preserving the file format of each configuration file. The file format includes instructions on how each entry in each configuration file is to be mapped into the tree structure.

Figure 1:
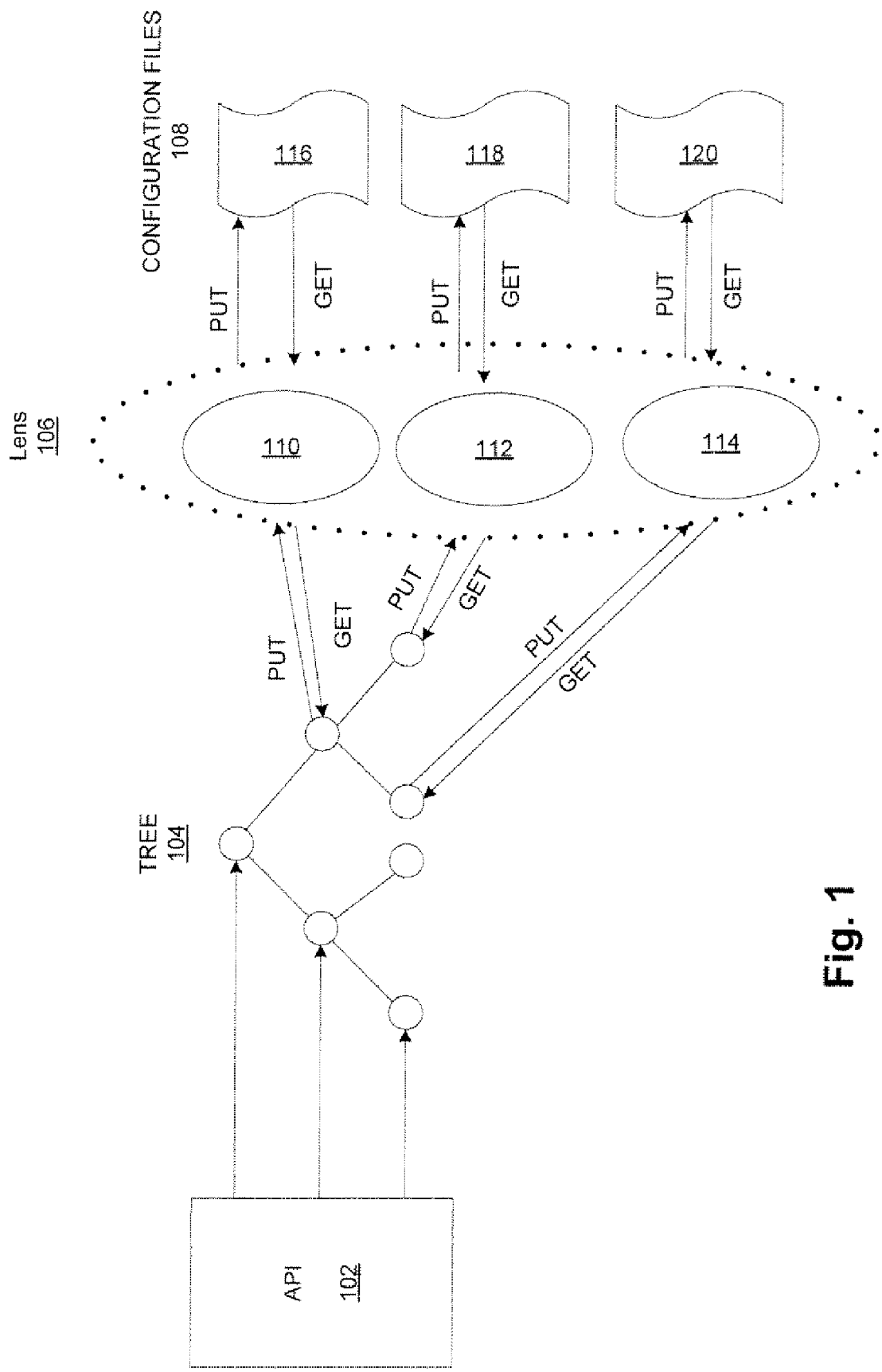
FIG. 1 is a block diagram illustrating one embodiment of an overall architecture for manipulating a configuration file through an API file.

FIG. 1 is a block diagram illustrating one embodiment of an overall architecture for manipulating a configuration file through an API file. A configuration editing tool 106 parses configuration files 108 in their native formats and transforms them into a single tree 104. Each configuration file 116, 118, and 120 may each have a different format corresponding to a particular lens or editing tool 106. For example, the format of configuration file 116 corresponds to lens 110. The format of configuration file 118 corresponds to lens 112. The format of configuration file 120 corresponds to lens 114. A local configuration API 102 manipulates tree 104 and saves it back into native configuration files 108.

The local configuration API 102 presents configuration data as a single tree. The tree is backed directly by the various configuration files without any additonal lookaside information. Therefore no changes to the programs using that data are required. The program can be used side-by-side with any other mechanism to change that data. The configuration editing tool 106 takes great care to preserve comments and formatting details, so that changes to tree 104 change the underlying configuration file in ways that are intuitive, easy to predict, and as close as possible to how a human would make the same change manually.

The transformation from configuration files 108 into tree 104, and from the updated tree 104 back to an updated file 108 is controlled by a description of each configuration file. The description is itself a configuration file and consists of a specification of the file format, expressed through regular expressions, and instructions on how each entry in the file is to be mapped into the tree 104.

The file format description consists for the most part of a lens 106 that transforms text into tree and tree into text at the same time, relieving the developer of keeping those two transformations synchronized. Lenses are statically type-checked so that a large number of problems can be diagnosed based on the lens only, preventing whole classes of runtime errors when the lens is applied to actual text.

Descriptions for new file formats can be added in a modular fashion; this makes it possible to distribute file format descriptions together with the configuration file, rather than the configuration editing tool.

In one embodiment, API 102 includes a simple command line tool that can be used for simple changes from shell scripts, as well as a public C library API, and bindings for Perl, Python, Ruby, Java, and OCaml. In that embodiment, file format descriptions for many common Linux configuration files are also provided.

Figure 2:
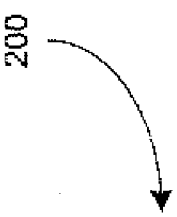
FIG. 2 is a block diagram illustrating one embodiment of a node of a tree.

FIG. 2 is a block diagram illustrating one embodiment of a node of a tree created by the editing tool. Each node in the tree consists of three pieces of data: a label 204, a value 206, and a list of sibling nodes 202 and child nodes 208. The label and value are both strings. The label is used in the path to the node and child nodes, much as file names are used in the paths to files in a file system, with the exception that multiple siblings can have the same label.

The public API allows traversing the tree with Xpath-like expressions, and therefore also provides a convenient way to query existing configuration files.

Figure 3:
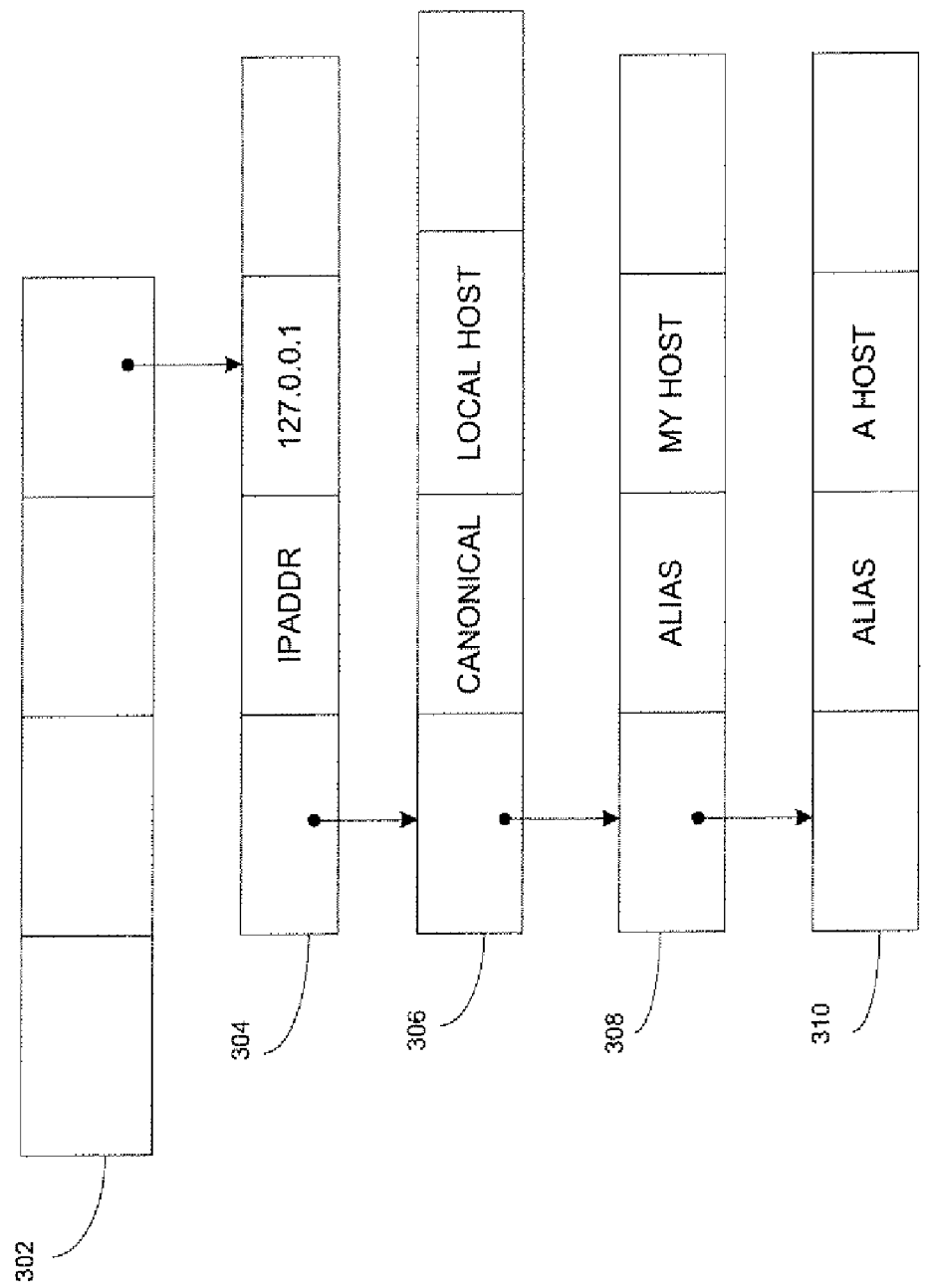
FIG. 3 is a block diagram illustrating one embodiment of a tree.

FIG. 3 is a block diagram illustrating one embodiment of a tree with the nodes of FIG. 2. A node 302 has a child node 304. Child node 304 has sibling nodes 306, 308, 310. A node can have multiple children with the same label. A node can have any number of children called foo. In paths, a specific child can be picked out with foo[N] where N is a positive number the first child with label foo is picked with foo[1], and the last can be picked with foo[last( )]. Just foo in a path picks all the children with that label.

Figure 4:
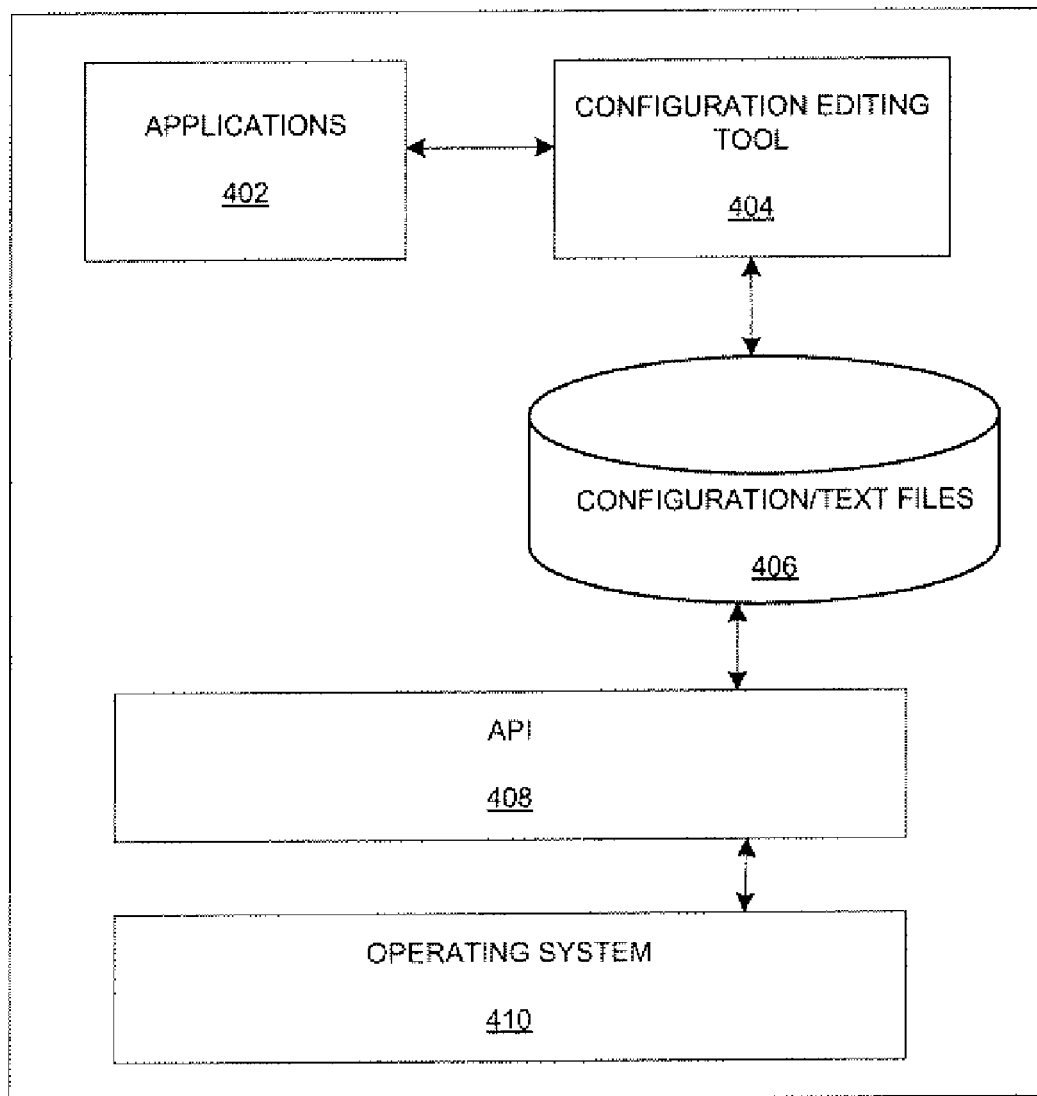
FIG. 4 is a block diagram illustrating one embodiment of an apparatus for editing configuration files.

FIG. 4 is a block diagram illustrating one embodiment of an apparatus 400 for editing configuration files. Apparatus 400 includes applications 402, configuration editing tool 404, configuration files 406, API 408, and operating system 410. Configuration editing tool 404 allows a user to edit or modify configuration files 406. Configuration editing tool 404 is described in more detail with respect to FIG. 5.

Figure 5:
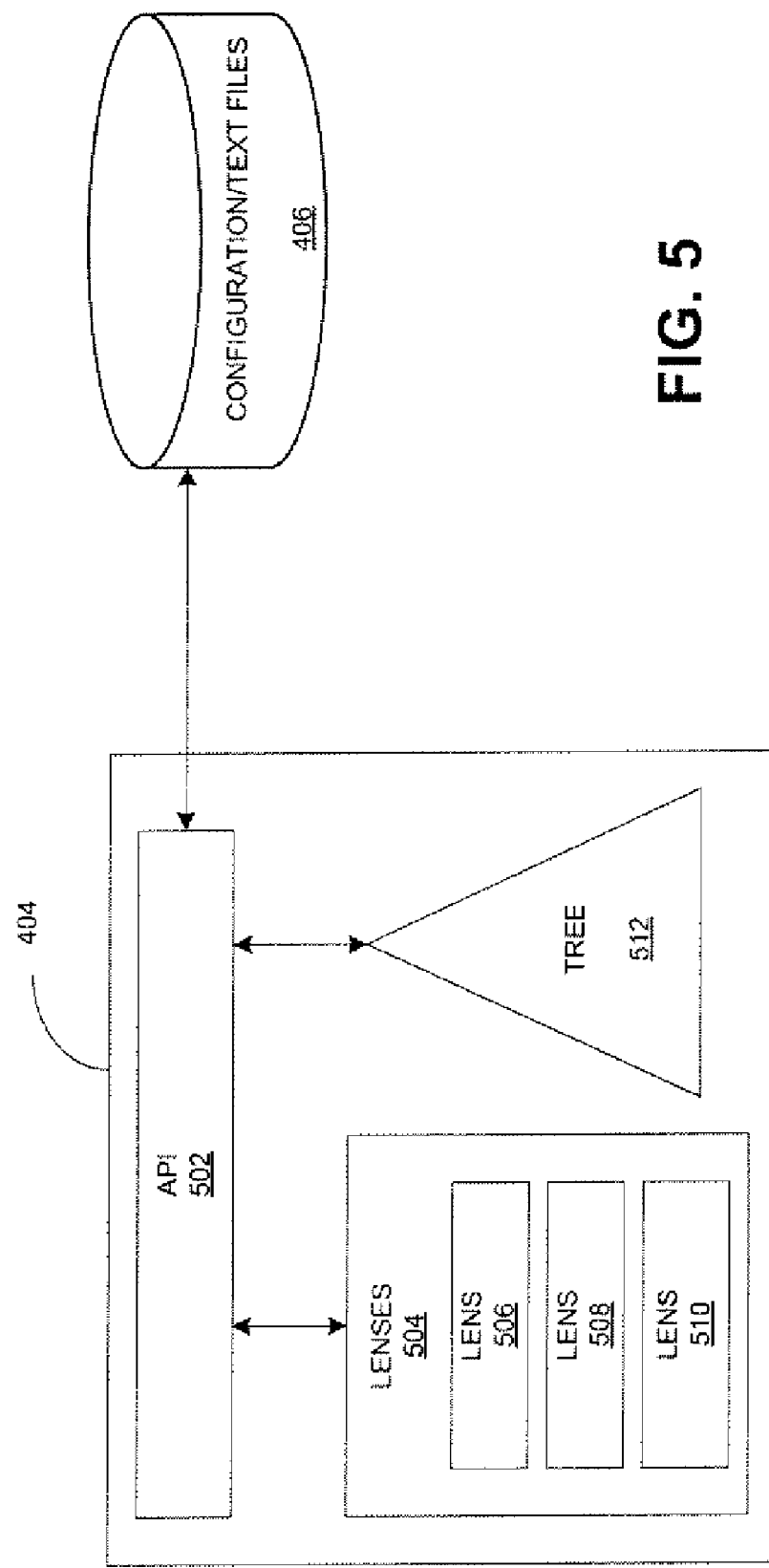
FIG. 5 is a block diagram illustrating one embodiment of the configuration editing tool.

FIG. 5 is a block diagram illustrating one embodiment of the configuration editing tool 404. Configuration editing tool 404 includes API 502, lenses 504 (506, 508, 510) and a tree 512. Lenses are the building blocks of the file to and from tree transformation. They combine parsing a configuration file and building the tree with "get" transformation, and turning the tree back into an updated configuration file with the "put" transformation.

A bidirectional language is one where the program expresses a transformation from input to output, and from (possibly modified) output back to the corresponding input. They are called bidirectional rather than bijective because there are generally many inputs for the same output and vice versa. In the present case, many input files (e.g., /etc/hosts with varying amounts of whitespace between fields) map to the same tree, and there are many ways to map the same tree back to a file.

Lenses 504 perform the parsing between the tree and the configuration file. For example, the parsing is performed with the lenses matching regular expressions. Different lenses do different things with the strings that match (create a new tree node with a certain label, store a value in a tree node, combine tree nodes into a larger tree). Writing the regular expressions is the main task when describing a file format.

Figure 6:
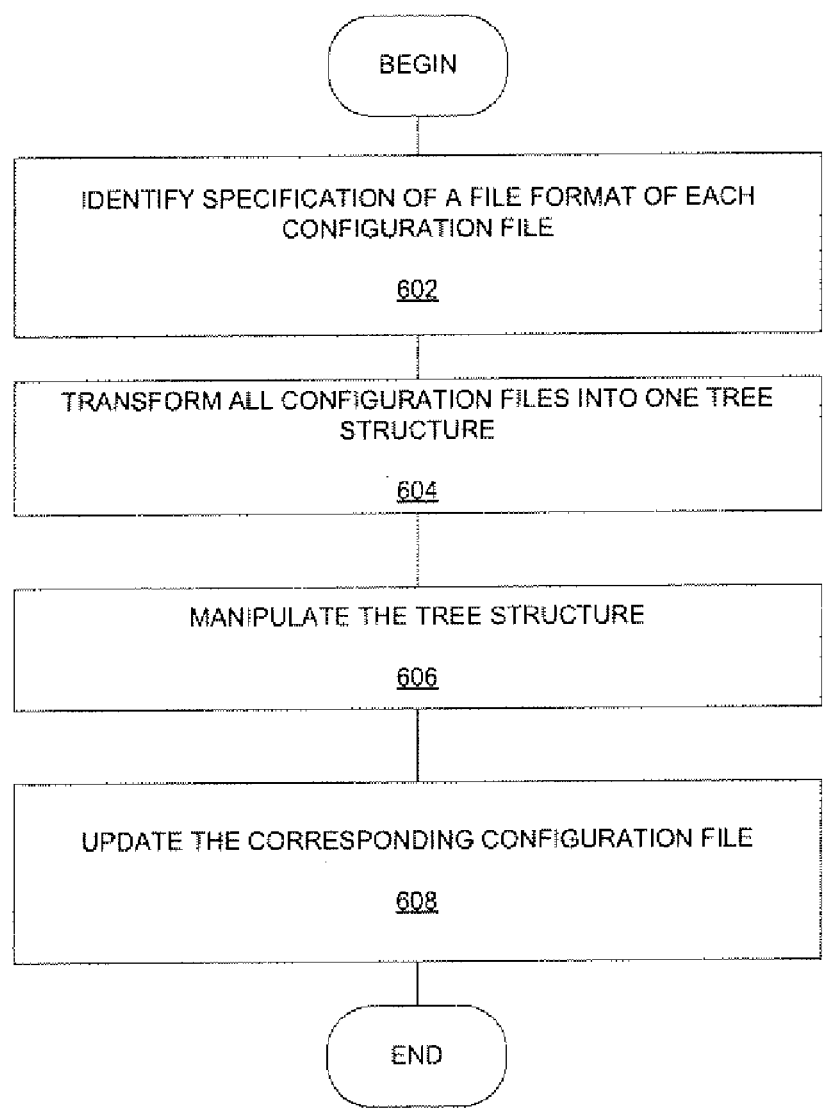
FIG. 6 is a flow diagram illustrating one embodiment of a method for editing configuration files.

FIG. 6 is a flow diagram illustrating one embodiment of a method for editing configuration files. At 602, a file format corresponding to each configuration file is identified. At 604, all configuration files are parsed into a single tree structure with the corresponding file format. At 606, the single tree structure is modified using an Application Program Interface (API). At 60S the configuration file is bidirectionally updated to reflect the modified tree structure while preserving the file format of the configuration files.

In one embodiment, the file format includes instructions on how each entry in the configuration file is to be mapped into the tree structure. The API includes a command line tool to manipulate the configuration file from a shell.

In another embodiment, mapping includes parsing the configuration file with a get function to produce the tree structure, and transforming the tree structure back into the configuration file with a put and create function.

Figure 7:
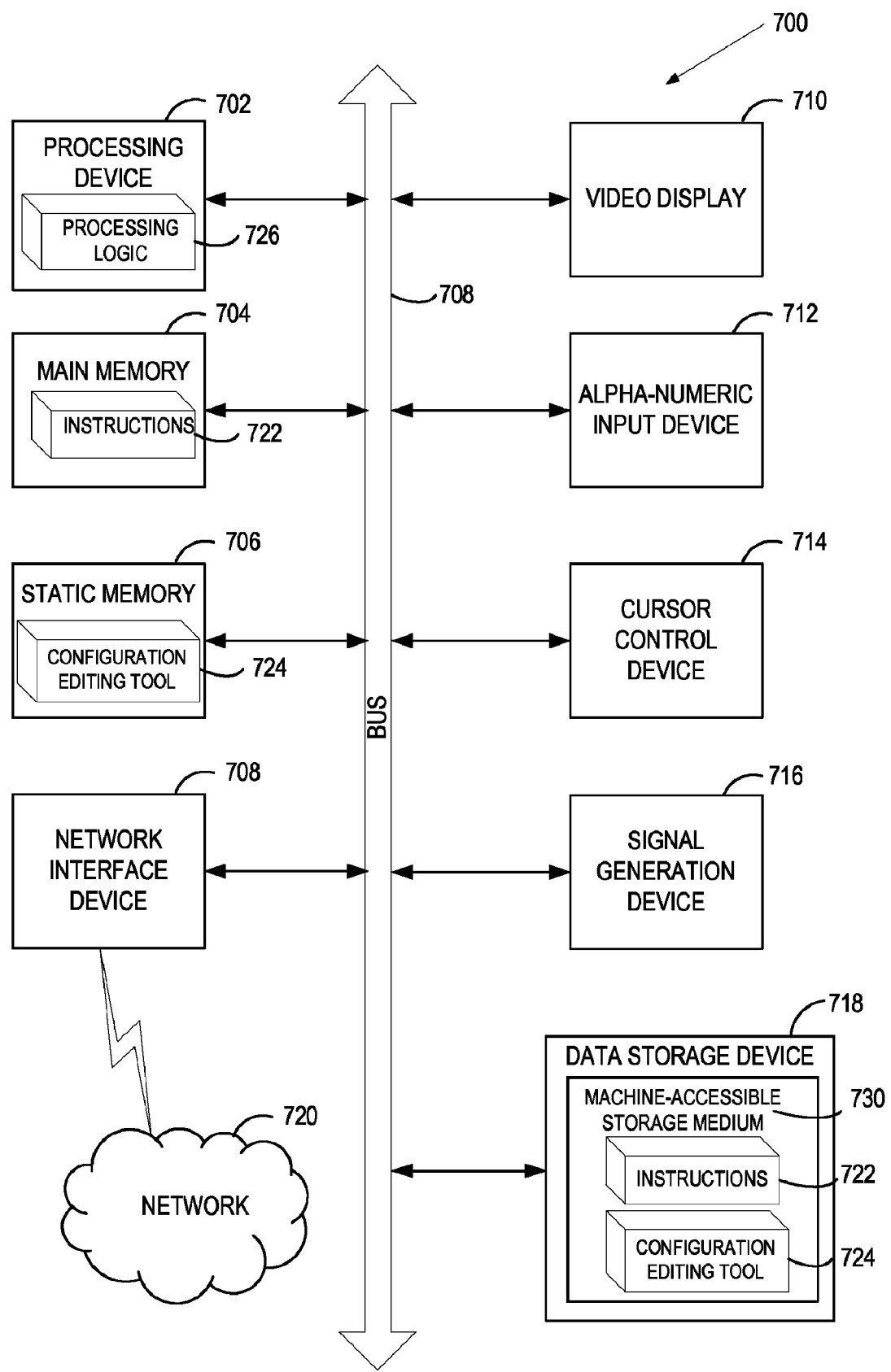
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (EPGA), a digital signal processor (DSP), network processor, or the like. The processing device 702 is configured to execute modules 726 (previously described with respect to FIG. 1) for performing the operations and steps discussed herein with. In one embodiment, the modules may be include hardware or software or a combination of both.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting computer-accessible storage media. The software 722 may further be transmitted or received over a network 720 via the network interface device 708.

The computer-accessible storage medium 730 may also be used to store the configuration editing tool 724 as presently described. The configuration editing tool 724 may also be stored in other sections of computer system 700, such as static memory 706.

While the computer-accessible storage medium 730 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a computer system, a corresponding file format for each of a plurality of configuration files;
   parsing by the computer system, via a get function, the plurality of configuration files into a single tree structure based on the corresponding file formats;
   synchronously mapping between entries of the plurality of configuration files and nodes of the single tree structure, wherein the mapping comprises transforming the single tree structure back into each corresponding configuration file via a put and create function;
   modifying, by the computer system, the single tree structure; and
   bidirectionally updating, by the computer system, each of the plurality of configuration files to reflect the modified single tree structure while preserving the corresponding file formats of the plurality of configuration files.

2. The method of claim 1 wherein a file format for a configuration file comprises instructions on how each entry in the configuration file is to be mapped into the single tree structure.

3. The method of claim 1 wherein the modifying is in response to input to a command line tool.

4. The method of claim 1 further comprising:
   storing a library of file formats.

5. The method of claim 1 wherein a node of the single tree structure comprises a sibling field, a label field, a value field, and a child field.

6. A non-transitory computer-readable storage medium, having instructions stored therein, which when executed, cause a computer system to perform a method comprising:
   identifying, by the computer system, a corresponding file format for each of a plurality of configuration files;
   parsing by the computer system, via a get function, the plurality of configuration files into a single tree structure based on the corresponding file formats;
   synchronously mapping between entries of the plurality of configuration files and nodes of the single tree structure, wherein the mapping comprises transforming the single tree structure back into each corresponding configuration file via a put and create function;
   modifying, by the computer system, the single tree structure; and
   bidirectionally updating, by the computer system, each of the plurality of configuration files to reflect the modified single tree structure while preserving the corresponding file formats of the plurality of configuration files.

7. The non-transitory computer-readable storage medium of claim 6 wherein a file format for a configuration file comprises instructions on how each entry in the configuration file is to be mapped into the single tree structure.

8. The non-transitory computer-readable storage medium of claim 6 wherein the modifying is in response to input to a command line tool.

9. The non-transitory computer-readable storage medium of claim 6 wherein the method further comprises:
   storing a library of file formats.

10. The non-transitory computer-readable storage medium of claim 6 wherein a node of the single tree structure comprises a sibling field, a label field, a value field, and a child field.

11. A system comprising:
    a memory to store a plurality of configuration files; and
    a processing device to:
    identify a corresponding file format for each of a plurality of configuration files, parse, via a get function, the plurality of configuration files into a single tree structure based on the corresponding file formats, synchronously map between entries of the plurality of configuration files and nodes of the single tree structure, wherein the mapping comprises transforming the single tree structure back into each corresponding configuration file via a put and create function, modify the single tree structure, and bidirectionally update each of the configuration files via manipulation of the single tree structure while preserving a corresponding file format for each of the plurality of configuration files.

12. The system of claim 11 wherein the modifying is in response to input to a command line tool.

13. The system of claim 11 wherein the memory is also to store a library of file formats, and wherein a file format for a configuration file comprises instructions on how each entry in the configuration file is to be mapped into the single tree structure.

14. The system of claim 11 wherein a node of the single tree structure includes a sibling field, a label field, a value field, and a child field.

* * * * *